United States Patent [19]

Allen

[11] 3,931,953

[45] Jan. 13, 1976

[54] ULTRA HIGH VACUUM VALVE

[75] Inventor: William Arthur Allen, Clarksburg, Md.

[73] Assignee: Communications Satellite Corporation (Comsat), Washington, D.C.

[22] Filed: May 9, 1974

[21] Appl. No.: 468,792

[52] U.S. Cl. .................. 251/62; 251/175; 251/196; 251/329
[51] Int. Cl.² ..................................... F16K 31/143
[58] Field of Search .............. 251/175, 196, 329, 62

[56] References Cited
UNITED STATES PATENTS

| | | | |
|---|---|---|---|
| 539,568 | 5/1895 | Bride | 251/175 UX |
| 1,957,807 | 5/1934 | Robinson | 251/175 X |
| 2,582,877 | 1/1952 | Mekler | 251/175 |
| 2,705,610 | 4/1955 | Hjulian | 251/175 |
| 2,873,761 | 2/1959 | Tailleferre | 251/175 X |
| 2,953,345 | 9/1960 | Slemmons | 251/175 X |

*Primary Examiner*—Harold W. Weakley
*Attorney, Agent, or Firm*—Sughrue, Rothwell, Mion & Zinn

[57] ABSTRACT

The valve is comprised of a substantially oblong chamber having one end thereof extending transversely into a conduit having a semi-circular slot formed therein. The portion of the chamber extending into the conduit is provided with a through passage in alignment with the conduit and a valve disc is movably mounted in the chamber for transverse movement relative to the conduit between an operative position in alignment with the conduit and an inoperative position outside of said conduit. An inflatable tube is secured in a peripheral groove in the circumference of the disc and is disposed in fluid communication with the interior of a hollow valve stem secured to the disc and extending outwardly of the chamber. A piston is connected to the valve stem for reciprocating movement in a double acting fluid cylinder and the extreme end of the valve stem extends into a chamber connectable to a source of air under pressure by a suitable valve to control the inflation of the inflatable tube. Limits switches are provided in the double acting cylinder to control valves which control the flow of air under pressure to the double acting cylinder and the chamber for inflating the tube. The inflation of the tube in the operative and inoperative positions will provide a positive sealing engagement in both positions and a deflation of the tube will allow the movement of the valve between the two positions.

4 Claims, 7 Drawing Figures

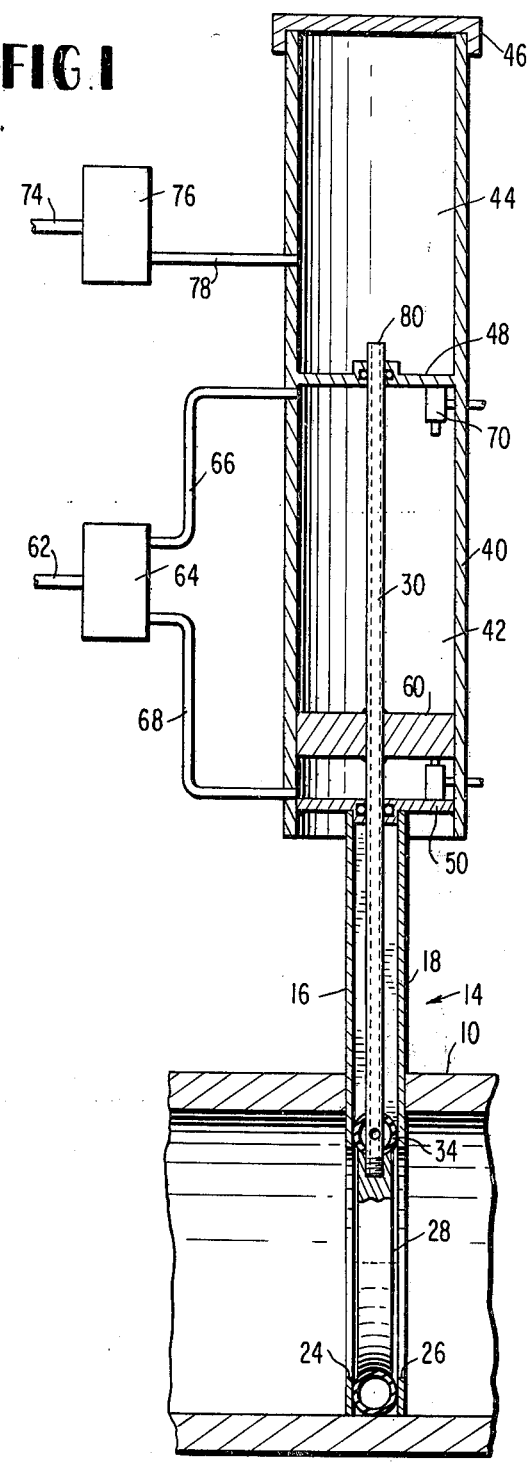
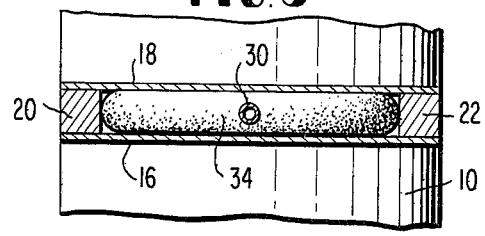
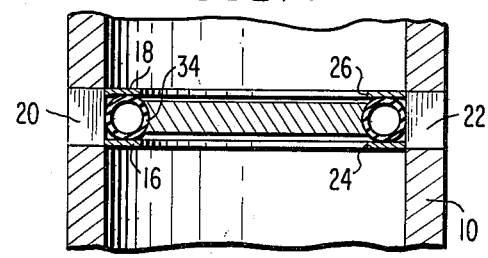
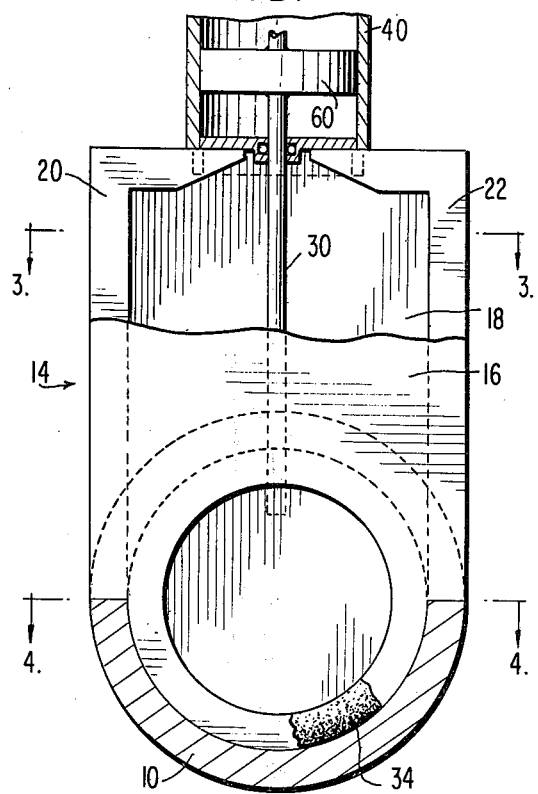

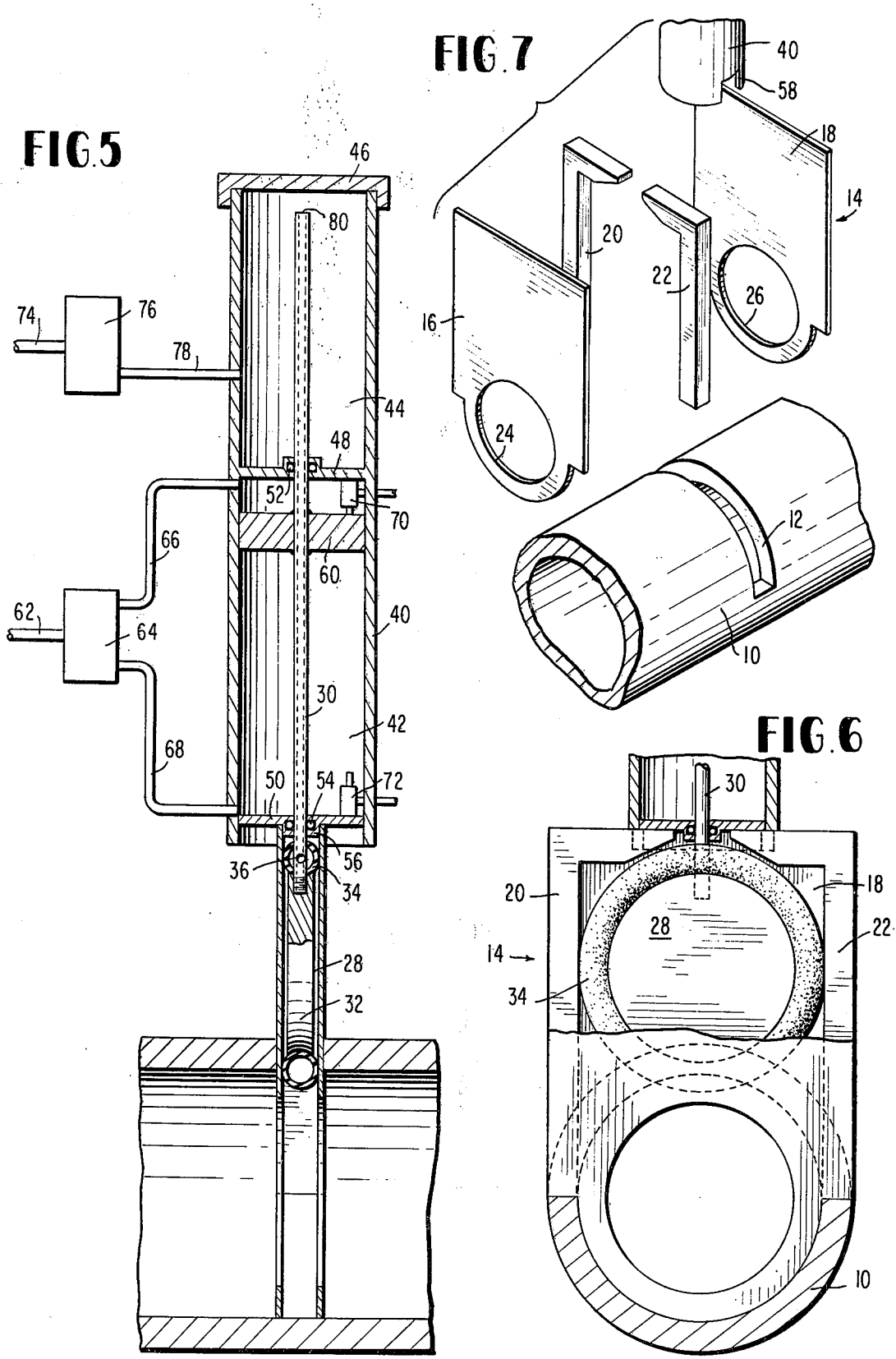

3,931,953

ULTRA HIGH VACUUM VALVE

BACKGROUND OF THE INVENTION

1. Field of the Invention

The present invention is directed to a valve having a transversely movable disc to open and close a fluid conduit and more particularly to a valve having a valve disc with an inflatable tube about the periphery thereof to provide positive sealing engagement of the valve disc within an operating chamber in both the operative and inoperative positions.

2. Prior Art

Typical prior art vacuum valves are gate valves with metal to metal sealing or metal to elastomer sealing. These prior art valves, however, will not be sufficiently leak proof and cannot withstand high temperatures. A disadvantage of the metal to metal sealing valve is the problem of wear after short periods of recycling. A relatively soft metal is needed to prevent leakage but such soft metals are more prone to wear. Elaborate mechanisms have been devised to slide the gate valve into position without scuffing and then locking the gate valve into a closed or open position. Frequent shut down for the replacement of the sealing material was necessary. Some gate valves of aluminum are restricted by outgassing problems. Those using elastomer O-ring seals have the same disadvantage as metal sealing valves in that a cam device or some means of reducing the friction of the sliding parts is needed when moving the gate valve and then pushing it against a seat when closed. In addition, the valve of this type is generally limited to temperatures of 200°C. All the present valves require a means for sealing the actuator shaft. The typical bellows-seal requires frequent replacement.

Other prior arts gate valves utilize some type of inflatable means on the valve disc which may be selectively expanded in the closed position of the valve to provide a sealing arrangement. However, these prior art valves do not provide for the inflation of the inflatable means on the valve disc in the inoperative position of the disc to prevent fluid leakage about the point where the valve operator passes through the housing of the valve.

SUMMARY OF THE INVENTION

The vacuum valve in accordance with the present invention is suitable for use in ultra high vacuum systems and chambers to seal off the area under vacuum from areas of atmospheric pressure. The valve mechanism of the present invention is sealed from the vacuum chamber whether the valve is in the open or closed position by an inflatable sealing ring.

The present invention provides a valve having an elastomer to metal seal which is operable in both high and low temperature environments while still maintaining resiliency after many cycles of operation.

The present invention provides a valve suitable for use in an ultra high vacuum system comprising a valve disc transversely movable between an operative position closing a conduit and an inoperative position outside of said conduit. The valve disc is movable within a casing secured to the conduit and a hollow valve stem connected to the periphery of the disc extends outwardly through said casing. An inflatable tube extends around and is secured to a peripheral groove in the circumference of the disc and is disposed in fluid communication with the interior of the hollow valve stem. A piston is secured to the hollow valve stem outside of the said casing and is movable in a cylinder wherein fluid pressure may be selectively applied to opposite sides thereof. The end of the hollow valve stem opposite the valve disc is movable within a chamber connected to a source of air under pressure by means of a valve which may be selectively energized and de-energized to provide for the inflation and deflation of the tube. Limit switches are provided within the cylinder for engagement with the piston to automatically control the fluid pressures for operating the valve disc and for inflating the tube thereon.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a longitudinal vertical section of view through the conduit and valve mechanism according to the present invention.

FIG. 2 is a partial transverse sectional view of the conduit and valve mechanism according to the present invention with parts broken away for the sake of clarity.

FIG. 3 is a sectional view taken along the line 3—3 of FIG. 2.

FIG. 4 is a sectional view taken along the line 4—4 of FIG. 2.

FIG. 5 is a view similar to FIG. 1 but showing the valve disc in the inoperative position.

FIG. 6 is a view similar to FIG. 2 but showing the valve disc in the inoperative position.

FIG. 7 is an exploded perspective view of the casing within which the valve disc operates and its relation to the conduit and the operating cylinder.

DETAILED DESCRIPTION OF THE INVENTION

The conduit 10 as illustrated in the drawings may be made of any suitable material depending upon the environment in which it is to be used and for the purposes of the present invention it is assumed to be connected at one end or the other to a vacuum source. The vacuum source may be a pump or other suitable mechanism but has not been shown since it is not deemed necessary for a complete understanding of the present invention. The conduit 10 is provided with a semi-circular slot 12 which is adapted for the reception of a valve chamber 14. The valve chamber 14 is substantially rectilinear except for the provision of a semi-circular curvature at one end which is adapted to mate with the internal configuration of the conduit 10. The chamber 14 is defined by a pair of plates 16 and 18 which are connected together by means of a pair of inverted L-shape spacers 20 and 22. The ends of the plates 16 and 18 having the semi-circular curvature are each provided with through apertures 24 and 26. The plates 16, 18 and the spacers 20 and 22 may be made of any suitable material and may be joined together by any conventional means such as adhesives or the like which will provide an air tight chamber. The chamber 14 is then inserted into the slot 12 and adhesively secured therein in a completely air tight manner by adhesives or any other suitable connection such as welding or the like depending upon the materials used. It is not necessary to bond the semi-circular edges of the plates 16 and 18 to the inner circumference of the conduit 10 but this could be done if desired. It is also contemplated that the conduit could be completely cut in half and secured to the plates of the valve chamber which would be inserted between the cut ends. In this case the spacers would extend about the curved end of the chamber to desire a complete chamber.

The gate valve is comprised of a circular disc 28 of any suitable material such as stainless steel, glass, ceramic or the like which is movably mounted within the chamber by means of a hollow valve stem 30 which is connected thereto for movement transversely of the conduit 10 between an operative position as shown in FIGS. 1 and 2 and an inoperative position as shown in FIGS. 5 and 6. The disc 28 is provided with a circumferential groove 32 in the periphery thereof. An inflatable annular tube 34 is cemented in the groove 32 and is disposed in fluid communication with the inside of the hollow valve stem 30 through an aperture 36. The diameter of the disc 28 is substantially the same as the apertures 24 and 26 in the plates 16 and 18 defined in the above chamber. Thus the inflatable tube 34 will be disposed between an annular portion of each plate 16 and 18 which surrounds the apertures 24 and 26 to provide for a tight sealing engagement upon inflation of the tube. The external diameter of the inflatable tube is substantially equal to the internal diameter of the conduit 10 so that outer periphery of the inflatable tube 34 will be disposed in tight sealing engagement with the internal surface of the conduit upon inflation except in the area of the slot 12. The inflatable tube may be of specially formulated carboxy nitroso rubber which will keep outgassing at a minimum and permit high vacuum levels. It is also possible to substitute a more acceptable material for the CNR sealing tube such as ethylene-propylene rubber or a CNR composite permitting higher baking temperatures. In any case the inflatable tube should be constructed of a material which will permit operation at extremely high or low temperatures.

In order to provide for the operation of the valve and to provide a suitable control for the inflation and deflation of the tube 34 a cylinder 40 is provided having a first chamber 42 and a second chamber 44. The cylinder 40 is closed at one end by means of a cap plate 46 and is provided with an intermediate divider plate 48 and an opposite end plate 50, both of which are provided with central apertures for the slidable reception of the valve stem 30. Suitable sealing means such as O-rings 52 and 54 may be provided about the apertures in the plates 48 and 50 to provide a slidable sealing arrangement for the valve stem 30. The end plate 50 is provided with a central boss 56 which extends into an opening in the valve chamber 14 defined by the end plates 16 and 18 and the opposed spaced apart ends of the spacers 20 and 22. The cylinder 40 may be provided with a pair of diametrically opposed notches 58 to allow for a close fitting sealing engagement between the valve chamber 14, the cylinder 40 and the end plate 50. These parts may be secured together in an air tight arrangement by means of adhesives or welding depending upon the type of material utilized. A piston 60 is secured to the valve stem 30 within the first chamber 42 and air under pressure from a suitable source may be supplied through conduit 62 to a suitable control valve 64 which will selectively direct the air under pressure to opposite sides of the piston 60 through conduits 66 and 68. A pair of limit switches 70 and 72 may be mounted within the chamber 42 for engagement by piston 60 in its two extreme positions to control the valve 64 as well as to control the inflation and deflation of the inflatable tube 34 as described hereinafter.

Air under pressure is also supplied through conduit 74 to a control valve 76 which will control the supply and exhaust of air under pressure to and from the chamber 44 through the conduit 78. The end 80 of the hollow valve stem 30 is in open communication with the interior of the chamber 44.

As an alternative construction it is contemplated that hollow valve stem 30 could also extend through the end cap 46 with the end of the valve stem being closed and connected to a manual operator so that the valve could be operated even in the event of a power failure. In such a modification it would then be necessary to provide an aperture in the hollow valve stem 30 which would always be disposed within the chamber 44 through the full range of movement of valve stem 30.

In the operation of the valve, FIG. 1 shows the valve disc 28 disposed in an operative position within the conduit 10. In this position air under pressure is being supplied through the conduit 74, control valve 76 and conduit 78 to the chamber 44 and through the hollow valve stem 30 to inflate the tube 34 into tight sealing engagement with the walls 16 and 18 of the valve chamber 14 and into tight sealing engagement with the interior periphery of the conduit 10. When it is desired to open the valve it is necessary to move the valve disc 28 to an inoperative position as shown in FIG. 5. Upon the operation of a suitable control switch the valve 76 will operate to exhaust the air under pressure from the inflatable tube 34 through the hollow valve stem 30, the chamber 44 and the conduit 78. It is preferrable to dimension the tube 34 such that even in its deflated condition it will still be maintained in light sliding relation with respect to the walls 16 and 18 of the valve chamber 14. This will allow for the easy sliding movement of the valve disc with a minimum amount of wear while still providing sufficient guiding. At the same time the valve 64 will be operated to exhaust the air under pressure through the conduit 66 and to supply air under pressure through conduit 68 to raise the piston 60 and the valve stem and valve attached thereto. When the piston 60 reaches the position shown in FIG. 5 it will engage an operative limit switch 70 which will initiate the operation of the valve 76 to supply air under pressure in a manner previously described to inflate the tube 34 into tight sealing engagement with the internal walls of the valve chamber 14. The operation of the limit switch could also operate the valve 64 to close off the conduit 68 thereby merely maintaining the piston 60 in a raised position by means of the trapped air pressure in the chamber 42. However, this is not absolutely necessary and communication could be maintained between the conduit 62 and the conduit 68 in the inoperative position of the valve.

By providing the tight sealing engagement of the inflated tube with the walls of the valve chamber in the inoperative position there will be no leakage whatsoever from the conduit 10 through the valve stem aperture in the plate 50. Thus it is not necessary to provide expensive or complicated sealing means about the sliding valve stem as was necessary in prior art valve arrangements. When it is desired to shift valve disc 28 from an inoperative position to the operative position a suitable control switch may be operated to initiate an operation which would be substantially identical to the operation described above but in the opposite direction.

Although the invention has been particularly shown and described with reference to a preferred embodiment thereof it will be understood by those in the art that various changes in form and details may be made therein without departing from the spirit and scope of the invention.

I claim:

1. A vacuum valve for a conduit having a slot transverse to the primary direction of flow comprising:
   a. a chamber means adaptable to being placed in the slot in said conduit, a first portion of said chamber means having an orifice permitting flow through the conduit and being adapted to extend into the conduit through said transverse slot and be sealingly connected to the conduit and a second portion thereof extending out of said conduit;
   b. a valve disc movably mounted within said chamber for transverse movement relative to the conduit between an operative-conduit position within the conduit, wherein said orificie is covered, and an inoperative-conduit position outside the conduit, wherein said orifice is uncovered;
   c. an inflatable sealing means disposed about the periphery of said disc;
   d. a hollow valve stem secured to said disc in fluid communication with said inflatable means and extending outwardly of said chamber means;
   e. operating means operatively connected to said valve stem externally of said chamber means for moving said disc within said chamber; and
   f. pressure means operatively connected to said hollow valve stem for supplying a pressurized medium to said inflatable means in both said operative position and said inoperative position of said disc to expand said inflatable means into air tight sealing engagement with said chamber means, whereby leakage past the valve disc in the operative-conduit position and about the disc from the chamber in the inoperative-conduit position is prevented.

2. A vacuum valve as set forth in claim 1 wherein said operating means comprises a piston secured to said valve stem externally of said chamber means, a cylinder within which said piston is slidably mounted and means for selectively supplying a pressurized medium to opposite sides of said piston to shift said disc between said operative and inoperative positions.

3. A vacuum valve as set forth in claim 1 wherein said pressure means is comprised of a chamber in which said valve stem is slidably disposed, means for supplying a pressurized medium to said chamber and an opening in said valve stem on a portion thereof which will always be located in said chamber to provide communication between said chamber and said inflatable sealing means through said hollow valve stem.

4. A vacuum valve as set forth in claim 1 wherein said inflatable means is comprised of an inflatable elastomeric tube, said disc having a peripheral groove in which said tube is secured.

* * * * *